(12) United States Patent  (10) Patent No.: US 8,015,752 B2
Fullerton et al.  (45) Date of Patent: Sep. 13, 2011

(54) CHILD SAFETY GATE APPARATUS, SYSTEMS, AND METHODS

(75) Inventors: Larry W. Fullerton, New Hope, AL (US); Mark D. Roberts, Huntsville, AL (US); James L Richards, Fayetteville, TN (US)

(73) Assignee: Correlated Magnetics Research, LLC, New Hope, AL (US)

( * ) Notice: Subject to any disclaimer, the term of this patent is extended or adjusted under 35 U.S.C. 154(b) by 0 days.

(21) Appl. No.: 12/896,453

(22) Filed: Oct. 1, 2010

(65) Prior Publication Data

US 2011/0018661 A1  Jan. 27, 2011

Related U.S. Application Data

(63) Continuation-in-part of application No. 12/476,952, filed on Jun. 2, 2009, and a continuation-in-part of application No. 12/322,561, filed on Feb. 4, 2009, and a continuation-in-part of application No. 12/358,423, filed on Jan. 23, 2009, now Pat. No. 7,868,721, and a continuation-in-part of application No. 12/123,718, filed on May 20, 2008, now Pat. No. 7,800,471.

(60) Provisional application No. 61/278,229, filed on Oct. 2, 2009.

(51) Int. Cl.
  *E06B 7/00* (2006.01)
(52) U.S. Cl. ............... 49/70; 335/285; 335/306
(58) Field of Classification Search .................. 335/285, 335/302–306; 49/70
  See application file for complete search history.

(56) References Cited

U.S. PATENT DOCUMENTS

| | | | |
|---|---|---|---|
| 381,968 A | 5/1888 | Tesla | |
| 493,858 A | 3/1893 | Edison | |
| 996,933 A | 7/1911 | Lindquist | |
| 1,236,234 A | 8/1917 | Troje | |
| 2,389,298 A | 11/1945 | Ellis | |
| 2,570,625 A | 10/1951 | Zimmerman et al. | |
| 2,722,617 A | 11/1955 | Kluwen et al. | |
| 3,102,314 A | 9/1963 | Alderfer | |
| 3,208,296 A | 9/1965 | Baermann | |
| 3,288,511 A | 11/1966 | Tavano | |
| 2,932,545 A | 4/1969 | Foley | |
| 3,468,576 A | 9/1969 | Beyer et al. | |
| 3,474,366 A | 10/1969 | Barney | |
| 3,802,034 A | 4/1974 | Bookless | |
| 4,079,559 A | 3/1978 | Tenbrummeler | |
| 4,222,489 A | 9/1980 | Hutter | |
| 4,453,294 A | 6/1984 | Morita | |
| 4,547,756 A | 10/1985 | Miller et al. | |
| 4,629,131 A | 12/1986 | Podell | |
| 4,738,053 A * | 4/1988 | Biesenthal | 49/70 |
| 4,941,236 A | 7/1990 | Sherman et al. | |
| 5,050,276 A | 9/1991 | Pemberton | |
| 5,367,891 A | 11/1994 | Furuyama | |
| 5,383,049 A | 1/1995 | Carr | |

(Continued)

FOREIGN PATENT DOCUMENTS

FR  823395  1/1938

*Primary Examiner* — Ramon M Barrera
(74) *Attorney, Agent, or Firm* — Tomas Friend (57) ABSTRACT

A child safety gate apparatus, system, and method comprises a barrier that is securable in a passageway and comprises at least one pair of correlated magnets capable of being aligned such that an attractive force secures or locks the gate.

20 Claims, 9 Drawing Sheets

U.S. PATENT DOCUMENTS

| | | |
|---|---|---|
| 5,495,221 A | 2/1996 | Post |
| 5,512,732 A | 4/1996 | Yagnik et al. |
| 5,631,093 A | 5/1997 | Perry et al. |
| 5,631,618 A | 5/1997 | Trumper et al. |
| 6,072,251 A | 6/2000 | Markle |
| 6,170,131 B1 | 1/2001 | Shin |
| 6,275,778 B1 | 8/2001 | Shimada et al. |
| 6,457,179 B1 | 10/2002 | Prendergast |
| 6,467,326 B1 | 10/2002 | Garrigus |
| 6,607,304 B1 | 8/2003 | Lake et al. |
| 6,720,698 B2 | 4/2004 | Galbraith |
| 6,847,134 B2 | 1/2005 | Frissen et al. |
| 6,862,748 B2 | 3/2005 | Prendergast |
| 6,927,657 B1 | 8/2005 | Wu |
| 6,971,147 B2 | 12/2005 | Halstead |
| 7,031,160 B2 | 4/2006 | Tillotson |
| 7,066,778 B2 | 6/2006 | Kretzschmar |
| 7,207,102 B1 | 4/2007 | Roesler |
| 7,362,018 B1 | 4/2008 | Kulogo et al. |
| 7,444,683 B2 | 11/2008 | Prendergast et al. |
| 2004/0003487 A1 | 1/2004 | Reiter |
| 2005/0102802 A1 | 5/2005 | Sitbon et al. |
| 2006/0066428 A1 | 3/2006 | McCarthy et al. |
| 2006/0189259 A1 | 8/2006 | Park et al. |
| 2006/0290451 A1 | 12/2006 | Prendergast et al. |
| 2008/0186683 A1 | 8/2008 | Ligtenberg et al. |
| 2008/0272868 A1 | 11/2008 | Prendergast et al. |
| 2008/0282517 A1 | 11/2008 | Claro |

* cited by examiner

FIG. 9 ns, and Methods
CHILD SAFETY GATE APPARATUS, SYSTEMS, AND METHODS

This patent application is a continuation-in-part of and claims priority under 35 U.S.C. 119 and 120 to U.S. Provisional Application Ser. No. 61/278,229, filed Oct. 2, 2010, and entitled "Apparatus, Systems, and Methods Using Correlated Magnets," which is incorporated herein by reference in its entirety.

This application is a continuation-in-part of and claim priority under 35 U.S.C. 120 to U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

FIELD OF THE INVENTION

The present invention relates generally to the application of field emission systems and methods to child and pet safety. More particularly, the present invention relates to an apparatus, system, and method for providing barriers configured to prevent child and pet movement through passageways or thresholds, including doorways, hallways, and gate and stairway thresholds.

BACKGROUND OF THE INVENTION

Many child and pet safety gates and barrier are known. Mechanical latches and/or locks are currently used but they can be difficult to latch and unlatch and can cause wear on gate and wall or doorway surfaces. Using mechanical latches that are relatively easy to latch and unlatch risks making it possible for toddlers or pets to open a safety gate or barrier. There is a need, therefore, for systems that provide for the relatively easy latching/locking and unlatching/unlocking of child and pet safety barriers that are relatively difficult for children and pets to open and that minimize wear on barrier and passageway surfaces. The present invention fills this need in the art by providing for an apparatus, systems, and methods for providing a child safety barrier comprising correlated magnets configured for latching/locking the barrier in a closed position and, optionally, latching/locking the barrier in an opened position. The system, apparatus and method are based, in part, upon recently developed correlated magnet technology.

SUMMARY OF THE INVENTION

The present invention is an apparatus, method and system for locking child and pet safety gates, child and pet safety barriers, and the like based, in part, on reversibly securing a surface of a moveable part of a passageway barrier to a fixed structure associated with a part of the passageway to be blocked using magnetic field emission systems and methods, often referred to as correlated magnets. Correlated magnets involve field emission structures comprising magnetic field sources having magnitudes, polarities, and positions corresponding to a desired spatial force function where a spatial force is created based upon the relative alignment of the field emission structures and the spatial force function. A correlated magnet comprises an array of magnetic sources (discrete magnets, printed magnetic sources or electromagnetic field emission sources) configured in accordance with a preselected code having desirable correlation properties. When a correlated magnet is brought into alignment with a complementary, or mirror image, correlated magnet, the magnetic field emission sources are aligned to produce a peak spatial attraction force. Misalignment of the complementary correlated magnets results in a configuration in which the magnetic field emission sources of the two correlated magnets substantially cancel each other out in a manner that is a function of the code according to which the field emission sources in the correlated magnets are arranged. When a correlated magnet is aligned with a duplicate correlated magnet, the magnetic field emission sources are aligned to produce a peak spatial repelling force. Misalignment of the duplicate correlated magnets results in a configuration in which the magnetic field emission sources of the two correlated magnets substantially cancel each other out as with complementary correlated magnets. Correlated magnets can be designed to have desired aligned (correlated) attracting and/or repelling spatial forces that can be used to reversibly latch and/or reversibly lock two surfaces together. The surfaces can be easily unlatched/unlocked by misaligning (decorrelating) the correlated magnets.

DETAILED DESCRIPTION OF THE INVENTION

Correlated magnetic technology and correlated magnets are fully described and enabled in the co-assigned issued U.S. Pat. No. 7,681,256 issued Mar. 23, 2010; U.S. Pat. No. 7,724,113 issued May 25, 2010; U.S. Pat. No. 7,746,205 issued Jun. 29, 2010; U.S. Pat. No. 7,750,773 issued Jul. 6, 2010; U.S. Pat. No. 7,750,774 issued Jul. 6, 2010; U.S. Pat. No. 7,750,779 issued Jul. 6, 2010; U.S. Pat. No. 7,750,780 issued Jul. 6, 2010; U.S. Pat. No. 7,750,781 issued Jul. 6, 2010; U.S. Pat. No. 7,750,778 issued Jul. 6, 2010; U.S. Pat. No. 7,755,462, issued Jul. 13, 2010; U.S. Pat. No. 7,760,058 issued Jul. 20, 2010; U.S. Pat. No. 7,772,951 issued Aug. 10, 2010; U.S. Pat. No. 7,772,952 issued Aug. 10, 2010; U.S. Pat. No. 7,800,471 issued Sep. 21, 2010; U.S. Pat. Nos. 7,800,472 issued Sep. 21, 2010; and 7,800,473 issued Sep. 21, 2010 and U.S. patent application Ser. Nos. 12/123,718 filed 20 May 2008; U.S. patent application Ser. No. 12/358,423 filed 23 Jan. 2009; and U.S. patent application Ser. No. 12/476,952 filed 2 Jun. 2009, which are incorporated herein by reference in their entirety. Correlated inductance, which is related to correlated magnetism, is described and enabled in U.S. patent application Ser. No. 12/322,561 filed 4 Feb. 2009 and is also incorporated by reference herein.

Correlated Magnet Technology:

Correlated magnet technology is briefly summarized here to assist the reader with understanding the present invention, but the details of correlated magnetics technology disclosed in the incorporated references are not repeated so that present invention may be described in detail. It should be understood that summary provided herein is not to be used to limit the scope of the present invention.

First and second correlated magnets comprise a first field emission structure and a second field emission structure. The first and second correlated magnets each comprise an array of field emission sources (discrete magnets, printed magnetic sources, or electromagnets) each having positions and polarities relating to a desired spatial force function that corresponds to the relative alignment of the first and second field emission structures within a field domain. The positions and polarities of each field emission source of each array of field emission sources can be determined in accordance with at least one correlation function. A separation distance between the first and second correlated magnets and their relative alignment creates a spatial force in accordance with the desired spatial force function, comprising at least one of an attractive force or a repellant force. The spatial force corresponds to a peak spatial force of said desired spatial force function when said first and second correlated magnets are substantially aligned such that each field emission source of the first correlated magnet substantially aligns with a corresponding field emission source of the correlated magnet. The non-peak, or non locking spatial force is less than the peak spatial force when the first and second field emission structures, or correlated magnets, are not substantially aligned such that field emission source of the first field emission structure substantially aligns with a corresponding field emission source of said second field emission structure.

The peak spatial force can be used to hold, or lock, two complementary correlated magnets together with a desired force. The peak spatial force can be used to hold, or lock, two identical correlated magnets apart with a desired force. If two complementary correlated magnets are secured to or incorporated within two objects, the complementary correlated magnets can be aligned to effectively lock two objects together with the desired spatial force. Because the desired spatial force is determined by the field emission sources in the correlated magnets, the desired attracting force of the aligned complementary correlated magnets can be set to a selected value by designing the correlated magnets accordingly. Consequently, two complementary correlated magnets can hold, or lock, two objects, or different parts of the same object, together with a preselected attracting force. This preselected locking force may be set, for example, to be 2 lbs, 3 lbs, 4 lbs, 5, lbs, 10 lbs, 15 lbs, 20, lbs, 25, lbs, 30 lbs, or more. When the complementary correlated magnets are moved relative to one another such that they are no longer substantially aligned, they are decorrelated from one another and the locking force is replaced by a non-peak force, or release force, that is substantially less than the locking force. Complementary correlated magnets can be designed to provide target locking and release forces that can be selected, for example, to allow the correlated magnets to be relatively easily separated when not aligned but relatively difficult to separate when aligned.

The spatial force of two repelling identical correlated magnets can also be used to hold, or lock, the two complementary correlated magnets apart with a desired force and used in the same way as correlated magnets having and attracting locking force.

The relative alignment of the first and second field emission structures can result from a relative movement of at least one of the first and second field emission structures with respect to the other along a path that can be a one-dimensional, a two-dimensional, or a three-dimensional movement path and can be linear, non-linear, rotational, cylindrical, spherical resulting from at least one of forward movement, backward movement, upward movement, downward movement, left movement, right movement, yaw, pitch, and or roll.

Generally, the spatial force functions of the present invention are in accordance with a code, where the code corresponds to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

Figure 1A:
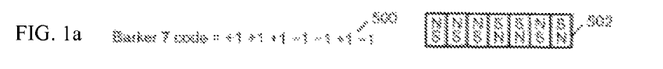
FIGS. 1a-p depict alignments of two complementary magnetic field structures.

FIG. 1A illustrates an example of a code that can be used to produce a linear array of magnetic field emission sources in a correlated magnet. A Barker length 7 code is used to determine polarities and positions of magnets making up a magnetic field emission structure, in this case a correlated magnet. Referring to FIG. 1A, a Barker length 7 code 500 is used to determine the polarities and the positions of magnets making up a magnetic field emission structure 502. Each magnet has the same or substantially the same magnetic field strength (or amplitude), which for the sake of this example is provided a unit of 1 (where A=Attract, R=Repel, A=−R, A=1, R=−1).

Figure 1B:
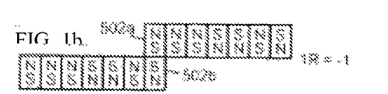
Figure 1C:
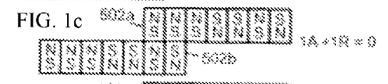
Figure 1D:
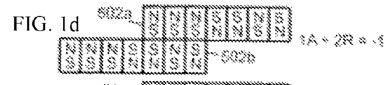
Figure 1E:
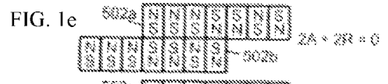
Figures 1F, 1G:
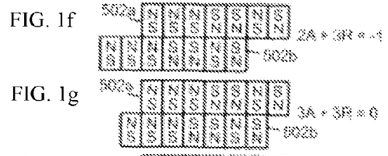
Figure 1H:
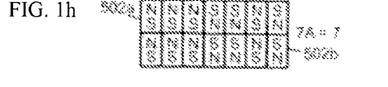
Figure 1I:
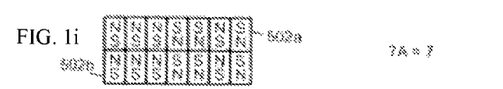
Figure 1J:
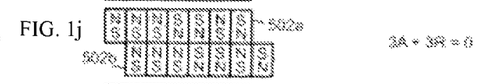
Figure 1K:
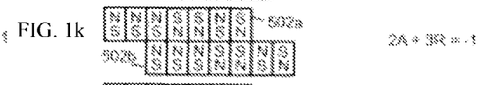
Figure 1L:
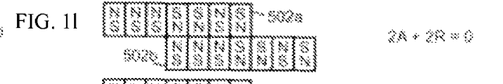
Figure 1M:
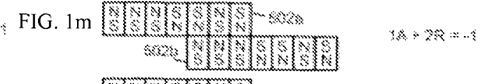
Figures 1N, 1O:
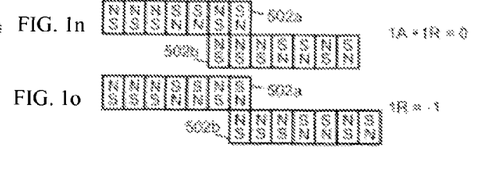

FIGS. 1B through 1O depict different alignments of two complementary magnetic field structures like that of FIG. 1A. A first magnetic field structure 502a is held stationary. A second magnetic field emission structure 502b that is identical to the first magnetic field emission structure 502a is shown sliding from left to right in 13 different alignments relative to the first magnetic field emission structure 502a in FIGS. 1B through 1O. The boundary where individual magnets of the two structures interact is referred to herein as an interface boundary. (Note that although the first magnetic field emission structure 502a is identical to the second magnetic field structure in terms of magnet field directions, the interfacing poles are of opposite or complementary polarity).

The total magnetic force between the first and second magnetic field emission structures 502a 502b is determined as the sum from left to right along the structure of the individual forces, at each magnet position, of each magnet or magnet pair interacting with its directly opposite corresponding magnet in the opposite magnetic field emission structure. Where only one magnet exists, the corresponding magnet is 0, and the force is 0. Where two magnets exist, the force is R for equal poles or A for opposite poles. Thus, for FIG. 1B, the first six positions to the left have no interaction. The one position in the center shows two "S" poles in contact for a repelling force of 1. The next six positions to the right have no interaction, for a total force of 1 R=−1, a repelling force of magnitude 1.

A force vs. position function may alternatively be called a spatial force function. In other words, for each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, it can be observed from the figures that the spatial force varies from −1 to 7, where the peak occurs when the two magnetic field emission structures are aligned such that their respective codes are aligned as shown in FIG. 1H and FIG. 1I. FIG. 1H and FIG. 1I show the same alignment, which is repeated for continuity between the two columns of figures. The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

Figure 1P:
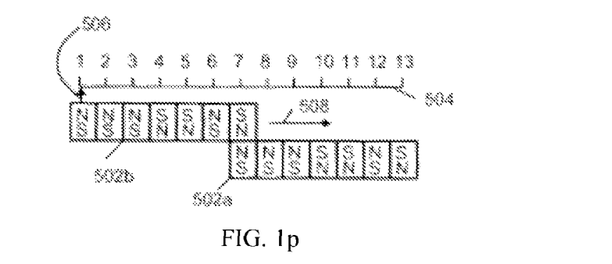
Figure 2:
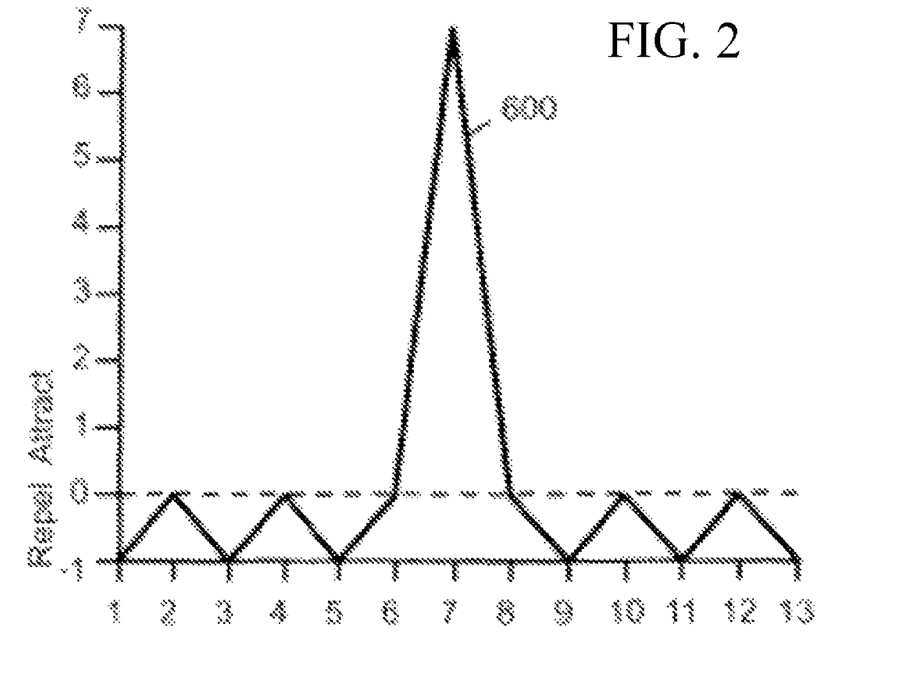
FIG. 2 depicts a spatial force function of magnetic field emission structures in FIGS. 1b-p.

FIG. 1P depicts the sliding action shown in FIGS. 1B through 1O in a single diagram. In FIG. 1P, a first magnet structure 502a is stationary while a second magnet structure 502b is moved across the top of the first magnet structure 502a in one direction 508 according to a scale 504. The second magnet structure 502b is shown at position 1 according to an indicating pointer 506, which moves with the left magnet of the second structure 502b. FIG. 2 depicts the binary autocorrelation function 600 of the Barker length 7 code, where the values at each alignment position 1 through 13 correspond to the spatial force values calculated for the thirteen alignment positions shown in FIGS. 1B through 1O (and in FIG. 1P). As such, since the magnets making up the magnetic field emission structures 502a, 502b have the same magnetic field strengths. FIG. 2 depicts the spatial force function of the two magnetic field emission structures of FIGS. 1B-1O and 1P. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures will be complementary to (i.e., mirror images of) each other. This complementary autocorrelation relationship can be seen in FIG. 5b where the bottom face of the first magnetic field emission structure 502b having the pattern 'S S S N N S N' is shown interacting with the top face of the second magnetic field emission structure 502a having the pattern 'N N N S S N S', which is the mirror image (pattern) of the bottom face of the first magnetic field emission structure 502b.

Figure 3A:
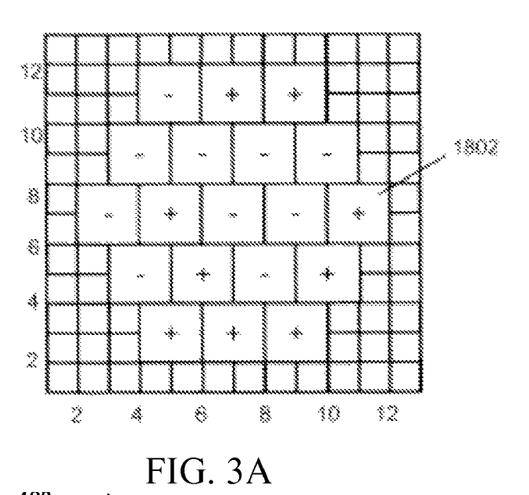
FIGS. 3a-c illustrates a code to produce a 2-dimensional magnetic field emission structure and corresponding spatial force function.
Figure 3B:
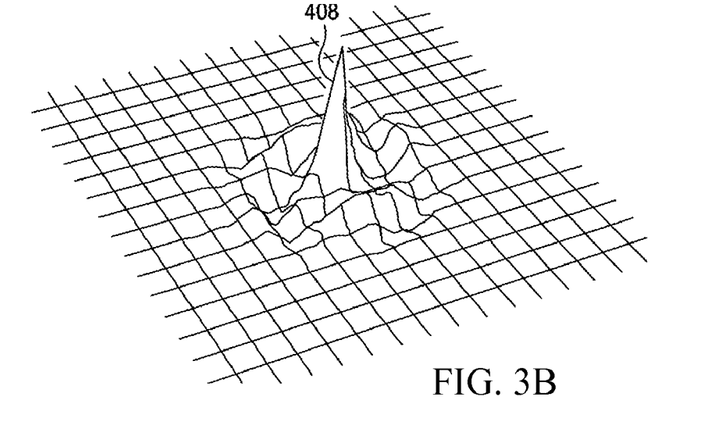
Figure 3C:
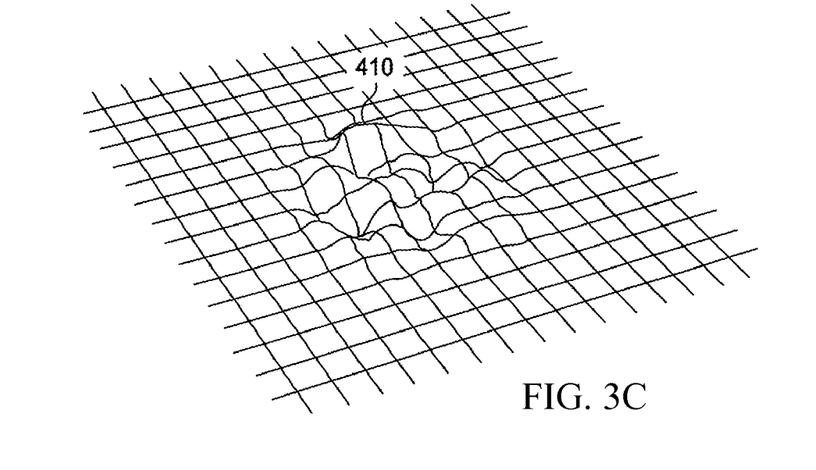

FIG. 3a depicts an exemplary code 1802 intended to produce a magnetic field emission structure, or correlated magnet, having a first stronger lock when aligned with its mirror image magnetic field emission structure and a second weaker lock when rotated 90° relative to its mirror image magnetic field emission structure. FIG. 3a shows magnet structure 1802 against a coordinate grid 1804. The magnet structure 1802 comprises magnets at positions: −1(3,7), −1(4,5), −1(4,7), +1(5,3), +1(5,7), −1(5,11), +1(6,5), −1(6,9), +1(7,3), −1(7,7), +1(7,11), −1(8,5), −1(8,9), +1(9,3), −1(9,7), +1(9,11), +1(10,5), −1(10,9)+1(11,7). Additional field emission structures may be derived by reversing the direction of the x coordinate or by reversing the direction of the y coordinate or by transposing the x and y coordinates. FIG. 3b depicts the peak spatial force function 1806 of a magnetic field emission structure 1802 interacting with its mirror image magnetic field emission structure when the two are substantially aligned. FIG. 3c depicts the spatial force function 1808 of magnetic field emission structure 1802 interacting with its mirror magnetic field emission structure after being rotated 90° with respect to aligned orientation. The peak occurs when substantially aligned but one structure rotated 90°.

Figure 4A:
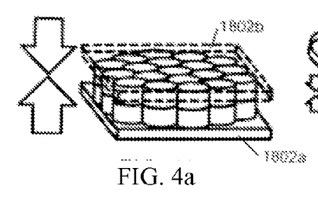
FIGS. 4a-4i depict an exemplary complementary correlated magnet pair.
Figure 4B:
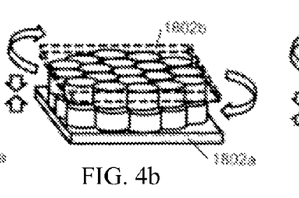
Figure 4C:
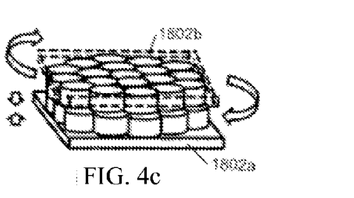
Figure 4D:
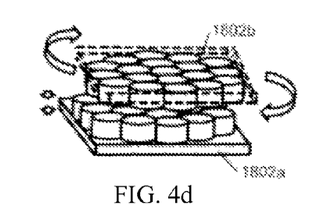
Figure 4E:
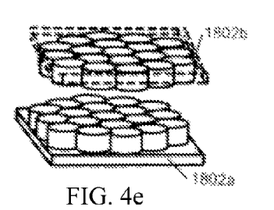
Figure 4F:
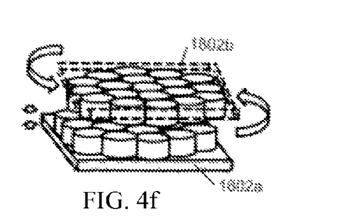
Figure 4G:
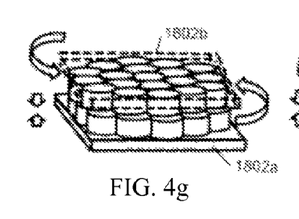
Figure 4H:
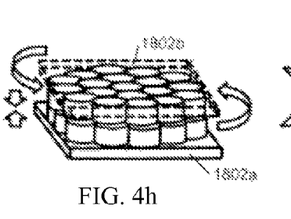
Figure 4I:
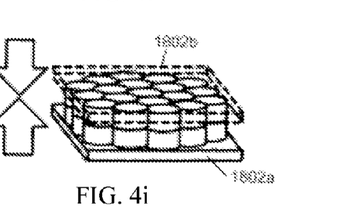

FIGS. 4a-4i depict the exemplary magnetic field emission structure 1802a and its mirror image magnetic field emission structure 1802b and the resulting spatial forces produced in accordance with their various alignments as they are twisted relative to each other. In FIG. 4a, the magnetic field emission structure 1802a and the mirror image magnetic field emission structure 1802b are aligned producing a peak spatial force. In FIG. 4b, the mirror image magnetic field emission structure 1802b is rotated clockwise slightly relative to the magnetic field emission structure 1802a and the attractive force reduces significantly. In FIG. 4c, the mirror image magnetic field emission structure 1802b is further rotated and the attractive force continues to decrease. In FIG. 4d, the mirror image magnetic field emission structure 1802b is still further rotated until the attractive force becomes very small, such that the two magnetic field emission structures are easily separated as shown in FIG. 4e. Given the two magnetic field emission structures held somewhat apart as in FIG. 4e, the structures can be moved closer and rotated towards alignment producing a small spatial force as in FIG. 4f. The spatial force increases as the two structures become more and more aligned in FIGS. 4g and 4h and a peak spatial force is achieved when aligned as in FIG. 4i. It should be noted that the direction of rotation was arbitrarily chosen and may be varied depending on the code employed. Additionally, the mirror image magnetic field emission structure 1802b is the mirror of magnetic field emission structure 1802a resulting in an attractive peak spatial force. The mirror image magnetic field emission structure 1802b could alternatively be coded such that when aligned with the magnetic field emission structure 1802a the peak spatial force would be a repelling force in which case the directions of the arrows used to indicate amplitude of the spatial force corresponding to the different alignments would be reversed such that the arrows faced away from each other.

Complementary correlated magnet pairs can be coded, for example, to produce a peak attractive force that is strong enough to prevent a small child, toddler, or pet from pulling the correlated magnets apart, but not so strong that an adult can't separate the aligned complementary correlated magnets. This can be useful, for example, if the correlated magnets are configured to be rotated relative to one another using a key-like turning mechanism and the key is not available. Some exemplary turning mechanisms that can be used to facilitate relative motion between correlated magnets and allow easy alignment and decorrelation are illustrated in FIGS. 5a-d.

Figures 5A, 5B, 5C:
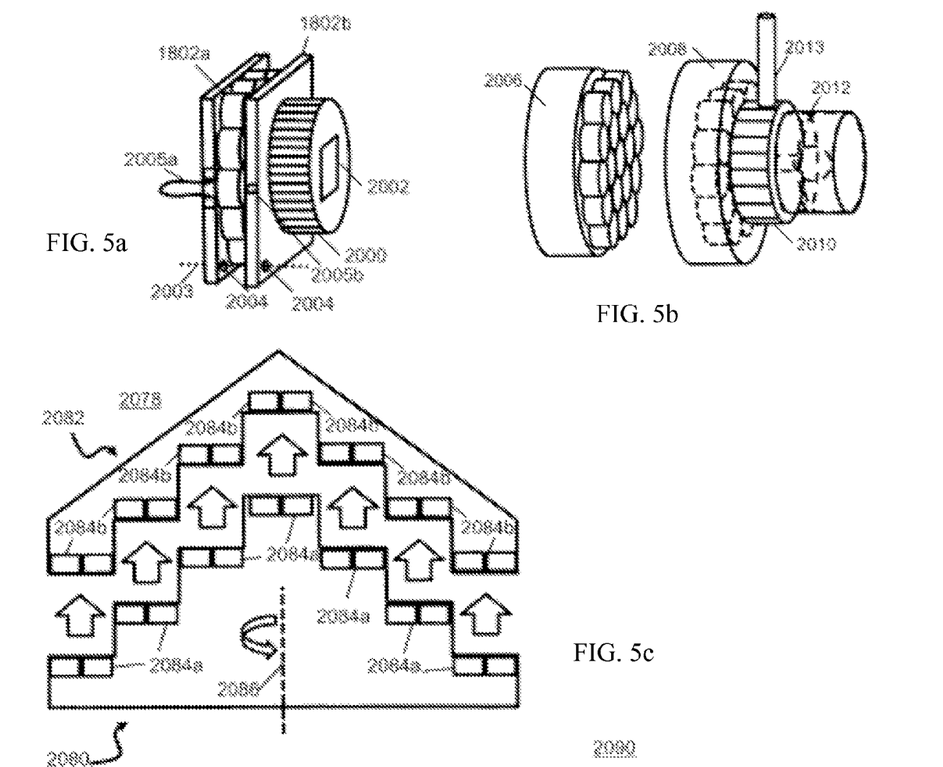
FIGS. 5a-d. illustrates some exemplary turning mechanisms to facilitate relative motion between correlated magnets.

FIG. 5a depicts two magnetic field emission structures 1802a and 1802b and with magnetic field emission structures 1802b including a turning mechanism 2000 that includes a tool insertion slot 2002. Both magnetic field emission structures include alignment marks 2004 along an axis 2003. A latch mechanism such as the hinged latch clip 2005a and latch knob 2005b may also be included preventing movement (particularly turning) of the magnetic field emission structures once aligned. Under one arrangement, a pivot mechanism (not shown) could be used to connect the two structures

1802a, 1802b at a pivot point such as at pivot location marks 2004 thereby allowing the two structures to be moved into or out of alignment via a circular motion about the pivot point (e.g., about the axis 2003). FIG. 5b depicts a first circular magnetic field emission structure housing 2006 and a second circular magnetic field emission structure housing 2008 configured such that the first housing 2006 can be inserted into the second housing 2008. The second housing 2008 is attached to an alternative turning mechanism 2010 that is connected to a swivel mechanism 2012 that would normally be attached to some other object. Also shown is a lever 2013 that can be used to provide turning leverage.

First housing 2006 and second housing 2008 can be used to mount or secure field emission structures (i.e. complementary correlated magnets) 1802a and 1802b to first and second objects to be locked together. For example, first housing 2006 containing correlated magnet 1802a can be secured to a moveable portion of a child safety gate or barrier and second housing 2008 containing correlated magnet 1802b can be secured to a frame or an object securely fixed to a surface of a passageway. Aligning the first and second complementary correlated magnets would latch or lock the child safety gate or barrier with a force equal to the peak, aligned attractive force of the correlated complementary magnets 1802a and 1802b. Additional pairs of first and second complementary correlated magnets can independently be used to provide additional latches, for example at top and/or bottom corner surfaces where a gate or barrier can be latched to a wall of a passageway or a rigid structure associated with a wall of a passageway such as a banister, a rail, or a latch mount. Additionally, first housing 2006 containing correlated magnet 1802a can be secured to a spring-loaded or tension-loaded mount and second housing 2008 containing correlated magnet 1802b can be secured to a frame holding a gate and configured to rigidly secure the frame to a surface in a passageway.

Figure 5D:
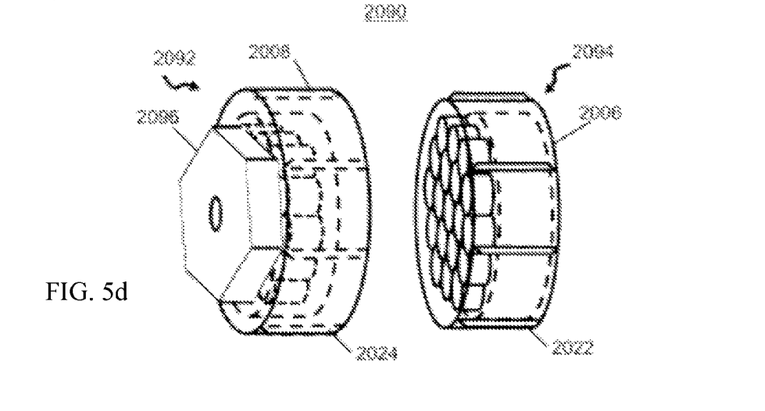

FIG. 5c depicts an exemplary gripping apparatus 2078 including a first part 2080 and a second part 2082. The first part 2080 comprises a saw tooth or stairs like structure where each tooth (or stair) has corresponding magnets making up a first magnetic field emission structure 2084a. The second part 2082 also comprises a saw tooth or stairs like structure where each tooth (or stair) has corresponding magnets making up a second magnetic field emission structure 2084b that is a mirror image of the first magnetic field emission structure 2084a. Under one arrangement each of the two parts shown are cross-sections of parts that have the same cross section as rotated up to 360° about a center axis 2086. FIG. 5d depicts an exemplary clasp mechanism 2090 including a first part 2092 and a second part 2094. The first part 2092 includes a first housing 2008 supporting a first magnetic field emission structure. The second part 2094 includes a second housing 2006 used to support a second magnetic field emission structure. The second housing 2006 includes raised guides 2022 that are configured to slide into guide slots 2024 of the first housing 2008. The first housing 2008 is also associated with a magnetic field emission structure slip ring mechanism 2096 that can be turned to rotate the magnetic field emission structure of the first part 2092 so as to align or misalign the two magnetic field emission structures of the clasp mechanism 2090.

While the slip ring mechanism 2096 is shown as having a hexagonal shape, the mechanism or any other mechanism for rotating or otherwise moving a 1-, 2-, or 3-dimensional correlated magnet relative to a complementary correlated magnet can have any convenient shape adapted to this purpose. For example, multiple correlated magnet pairs may be designed to use the same or differently shaped slots selected to be compatible with the same or different key-like turning mechanisms designed to be inserted into the slots. Differently or identically shaped protrusions such as triangles, squares, ovals, polygons stars, etc. may be placed on housings connected to correlated magnets and designed to work with tools adapted to fit onto these shapes in order to provide leverage for twisting one correlated magnet relative to its complementary correlated magnet.

The first and second of complementary pair of correlated magnets can be secured to, or incorporated as integral parts of, two different objects or different parts of the same object. By aligning the complementary correlated magnets, the two objects or different parts of the same object can be locked together with the attractive force of the peak, aligned force of the aligned complementary correlated magnets. Each of the complementary correlated magnets may, for example, be each independently be secured or attached to an object directly or indirectly by means of an adhesive, one or more screws, bolts, ties, or straps, or the correlated magnets may be an integral part of an object. For example, a plastic or glass object may be cast in a mold containing a correlated magnet.

Figure 6:
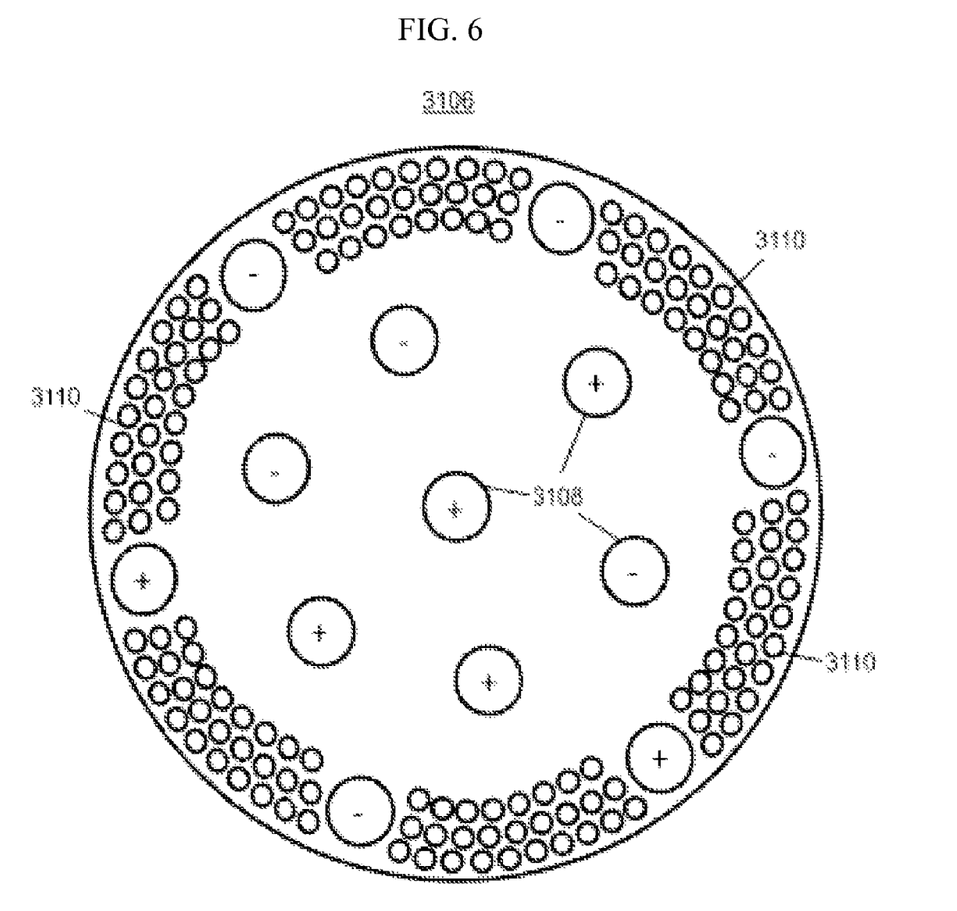
FIG. 6 depicts a magnetic field emission structure used to produce an attracting-repelling correlated magnet pair.

FIG. 6 depicts a magnetic field emission structure 3106 made up of a sparse array of large magnetic field sources 3108 combined with a large number of smaller magnetic field sources 3110 whereby alignment with a mirror image magnetic field emission structure would be provided by the large sources and a repel force would be provided by the smaller sources. Generally, the larger (i.e., stronger) magnets achieve a significant attraction force (or repelling force) at a greater separation distance than smaller magnets. Combinational structures having magnetic field sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. The sparse array of stronger magnets 3108 is coded such that it can correlate with a mirror image sparse array of comparable magnets. However, the number and polarity of the smaller (i.e., weaker) magnets 3110 can be tailored such that when the two magnetic field emission structures are substantially close together, the magnetic force of the smaller magnets can overtake that of the larger magnets 3108 such that an equilibrium will be achieved at some distance between the two magnetic field emission structures. Combinations of correlated and non-correlated magnets can be used together, for example, the weaker magnets 3110 of FIG. 6 may all be uncorrelated magnets. Complementary correlated magnets having an attract—repel equilibrium allow the construction of correlated magnet locks that leave a gap distance between aligned, complementary correlated magnets. Such locks may be useful in cases where two surfaces preferably do not form a seal in order, for example to allow for ventilation or to prevent the pinching of a finger between two correlated magnets.

FIGS. 7a-7e depict exemplary child safety gate latch mechanisms. The latch mechanism 6900 includes a first correlated magnet 6902a and a second correlated magnet 6902b that is complementary to the first correlated magnet 6902a. The second correlated magnet 6902b is associated with a latch body 6904 and is configured to rotate about an axis 6905. The second correlated magnet 6902b is integrated into the latch body 6904 and a turning mechanism 6906 is provided outside the latch body for turning the structure 6902b.

Figure 7A:
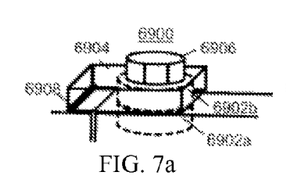
FIGS. 7a-7e depict exemplary child safety gate latch mechanisms.
Figure 7B:
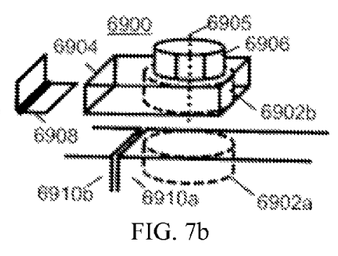

The first correlated magnet 6902a is associated with a gate 6910a. A hinge 6908 is used to attach the latch body 6904 to a structural element on a first side of said passageway or a second gate 6910b. When fully assembled, the first correlated magnet 6902a associated with the gate 6910a can be aligned with the second correlated magnet 6902b associated with the latch body 6904 (and thus the side of said passageway or a second gate 6910b) such that the structures 6902a, 6902b produce an attractive force that secures, or locks, the gate latch mechanism 6900 thereby securing the gate and the side of said passageway or a second gate 6910a, 6910b to each other. The turning mechanism can be turned to decorrelate the two correlated magnets, enabling the latch body to be lifted to unlatch the gate latch mechanism. Although a hinge is depicted, one skilled in the art will recognize that various other mechanisms other than a hinge can be used such as a sliding mechanism or a strap. Alternatively, the second magnetic field structure 6902b might reside on the outside of the latch body 6904.

Figure 7C:
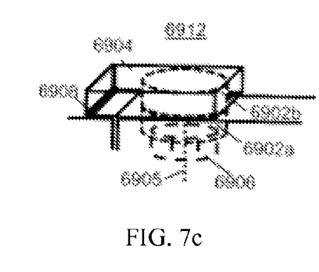

Under one arrangement, depicted in FIG. 7c, the turning mechanism is associated with the first correlated magnet 6902a in which case the second correlated magnet 6902b is fixed and the first correlated magnet 6902a is configured to turn about an axis 6905. Under another arrangement, the turning mechanism is integrated with a magnetic field structure and requires a tool for turning. Under such an arrangement, the turning mechanism and magnetic field structure may not be visible. Generally, all sorts of configurations are possible for latch mechanisms comprising a first and second correlated magnets that are complementary to each other where either of the first or second correlated magnets is associated with a gate, barrier, or a structural member of a passageway.

Figure 7D:
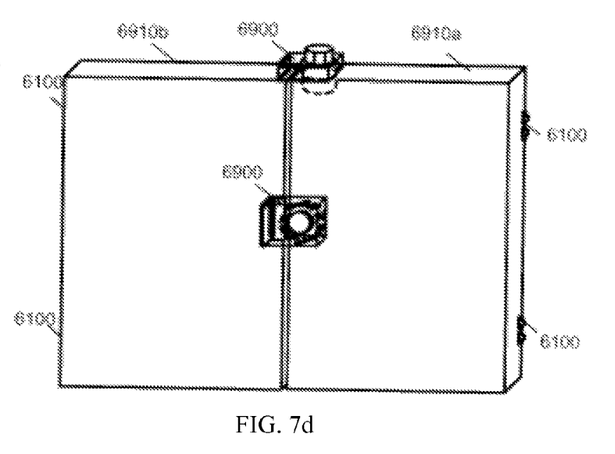

FIG. 7d depicts the use of the latch mechanism 6900 on top of two gates or barriers. The latch mechanism can similarly be used on the bottom of two gates or barriers. FIG. 7d also depicts use of the latch mechanism 6900 on the front of two gates. The latch mechanism can similarly be used on the back side of two gates (or a gate and a gate frame).

Figure 7E:
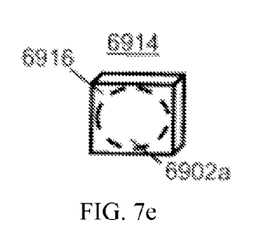

FIG. 7e depicts an alternative latch body 6914 consisting of a material 6916 having associated with it a first correlated magnet 6902a that is fixed to or integrated within the material 6916. The alternative latch body 6914 can be installed in a gate, a gate frame, a surface of a passageway, or an object secured to a structural member of a passageway and is configured to attach to a second correlated magnet 6902b associated with gate, a gate frame, a surface of a passageway, or an object secured to a structural member of a passageway when aligned with the first magnetic field structure 6902a so as to lock the gate. A turning mechanism 6906 can optionally be used to turn the second structure in order to detach the two structures 6902a, 6902b.

Generally, latch mechanisms described herein can be used for all sorts of applications such as for securing cabinets (e.g., kitchen, bathroom, medicine cabinets), drawers, appliances (i.e., oven, dishwasher, clothes washer, dryer, microwave, etc.) and protective covers for electrical outlets and light switches. Such latch mechanisms are ideal for child safety applications and applications where it is desirable that animals (e.g., pets, raccoons, etc.) be unable to unlatch a latch mechanism.

Figure 8A:
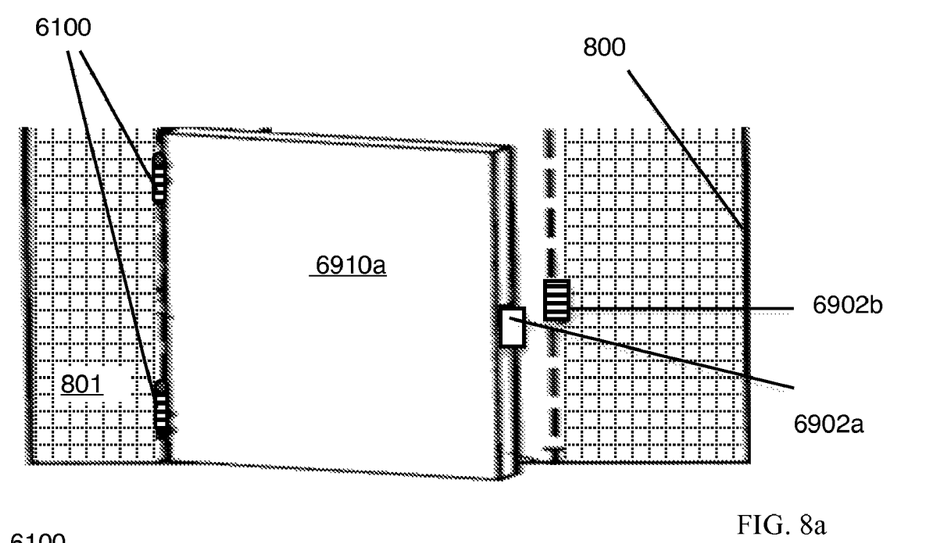
FIGS. 8a and 8b illustrate two exemplary embodiments of a child safety gate according to the present invention having hinged moveable portions.
Figure 8B:
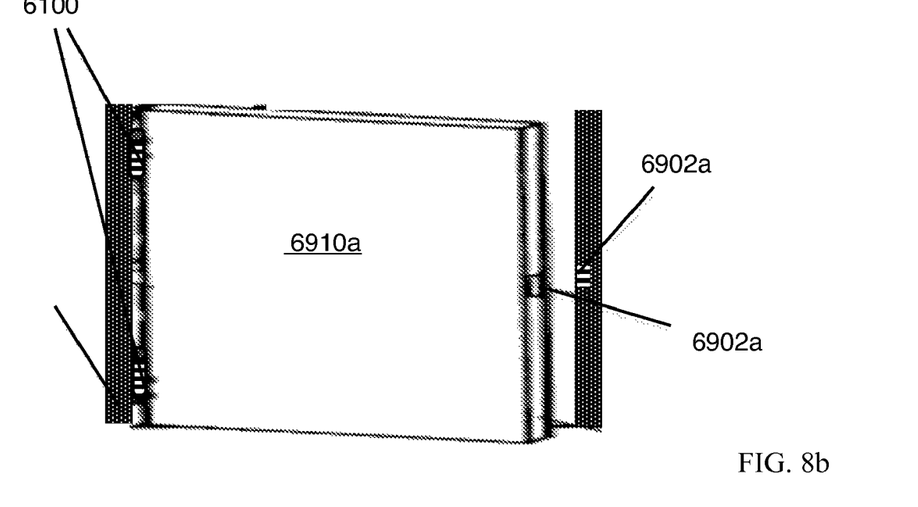

FIG. 8a and FIG. 8b illustrate two exemplary embodiments of a child safety gate according to the present invention having hinged moveable portions 6910a. The gate in FIG. 8a comprises a gate frame 800 that is secured to first and second sides of a passageway to be blocked. The frame 800 contains a non-moving portion 801 comprised of a material that prevents the passage of a child or pet through the frame 800, such as bars, netting, or fabric. The moveable portion of the gate 6910 is attached to the frame by hinges 6100. Complementary correlated magnets 6902a and 6902b are located on an edge of the moveable portion of the gate 6910a and the gate frame 800 such that the two complementary correlated magnets can be aligned to produce a peak attractive force that is sufficient to prevent a child or pet from opening the gate. The correlated magnets 6902a, 6902b are configured to produce an attractive force that is a peak spatial force of a spatial force function corresponding to a code modulo defined by a code that defines the peak spatial force and off peak spatial forces, and the off peak spatial forces have a maximum spatial force that is less than half of the peak spatial force. The correlated magnets 6902a, 6902b are preferably configured with the first magnet 6902a located on a front or back surface of the moveable portion of the gate 6910a and the second magnet 6902b located on a front or back surface of the frame 800 (dashed line). One or both of the correlated magnets 6902a, 6902b may be located on overlapping extensions attached to the gate 6910a and/or the gate frame 800 or the magnets 6902a, 6902b can be secured to one or more flexible straps affixed to the moveable portion of the gate 6910a and/or and the gate frame 800.

FIG. 8b illustrates a child safety gate (or barrier) comprising a moveable portion 6910 that is hinged directly to a first side of a passageway 6910b by hinges 6100. A first correlated magnet 6902a is located on the moveable portion 6910a on the side opposite the hinges 6100. A second correlated magnet 6902b is associated with a second side of the passageway 6910 such that, when the gate is in the closed position, the correlated magnets 6910a, 6019b are alignable to produce a peak attractive force that secures the gate in the closed position with a force that is sufficient to prevent a small child or pet from opening the gate. The magnets 6910a, 6910b may be incorporated into the gate and/or the passageway or they may be attachable to the gate and/or the passageway by an adhesive, a strap, a cable, a screw a bolt, a rivet, or any other means of attachment.

Figure 9:
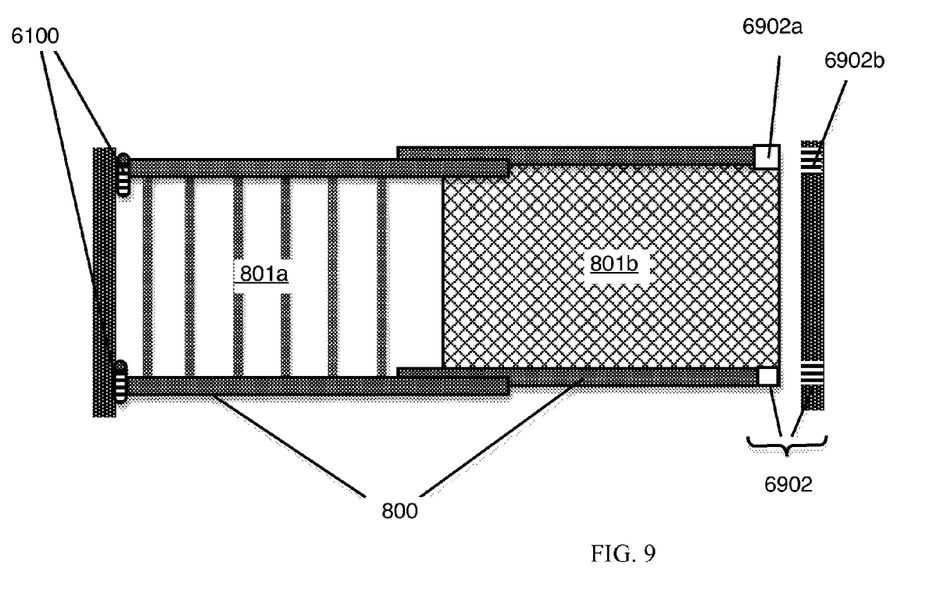
FIG. 9 illustrates an example of a sliding child safety gate comprising a complementary correlated magnet latch.

FIG. 9 illustrates an example of a sliding child safety gate comprising a complementary correlated magnet latch. The gate comprises first and second moveable portions 801a, 801b. The moveable potions may comprise, for example, vertical bars, netting, fabric, or a solid sheet material to prevent the movement of a child or met through the gate. The first and second moveable portions 801a, 801b comprise horizontal members that form a frame 800 and are configured to slide over one another to extend or contract the gate. The first moveable section is secured to a first side of a passageway by hinges 6100. Two pairs of complementary correlated magnets 6902 are configured to be alignable when the gate is in a closed position. The magnets of the correlated magnet pairs may be incorporated into the gate frame and/or the passageway or to straps or brackets secured to the gate 800 and/or the passageway. The first magnets of the correlated magnet pairs may, for example, be located on the ends of the horizontal members 800 facing a vertical member mounted to a wall of the passageway, while the second magnets of the pairs of correlated magnets may located inside openings on a side of the vertical member facing the passageway. Alternatively, the pairs of correlated magnets may be configured in a manner analogous to the other examples provided herein.

Hinges 6100 in FIGS. 8a, 8b, and 9 are shown as conventional hinges that swing parallel to the ground about a vertical axis, but may also include hinges that also allow the moveable portion of the gate to swing upward and the moveable portion of the gate 6910a is deformable to simultaneously compress in the horizontal direction and extend in a vertical direction such that the portion of the gate housing first correlated magnet 6902a lifts up an away from second correlated magnet 6902b. Hinges 6100 are not a requirement for the present invention. For example, a gate system according to the present invention may consist of a barrier and first correlated magnets of two or more correlated magnet pairs and the second of two or more correlated magnet pairs secured to one or more sides of a passageway.

While particular embodiments of the invention have been described, it will be understood, however, that the invention is not limited thereto, since modifications may be made by those skilled in the art, particularly in light of the foregoing teachings.

The invention claimed is:

1. A child safety barrier, comprising:
    a passageway barrier assembly for a passageway, said passageway having first and second opposed sides, wherein said barrier assembly comprises:
    a first correlated magnet attachable to a structural element on the first side of said passageway and
    a barrier comprising a second correlated magnet, said barrier being attachable to a second structural element on the second side of the passageway opposing said first side and positionable into a closed state in which the barrier spans across the passageway and an open state in which the barrier does not span across the passageway; and wherein:
    said first correlated magnet is capable of being aligned with said second correlated magnet such that said first and second correlated magnets produce an attractive force that holds said first and second magnets together and secures said barrier in said closed position;
    said attractive force is a peak spatial force of a spatial force function;
    said spatial force function corresponds to a code modulo defined by a code that defines said peak spatial force and a plurality of off peak spatial forces; and
    said plurality of off peak spatial forces have a largest off peak spatial force that is less than half of the peak spatial force.

2. The child safety barrier of claim 1, further comprising a turning mechanism adapted to be applied to said first or said second correlated magnetic to decorrelate said first and said second correlated magnets and enabling said barrier to by positionable into an opened state in which the barrier does not span across said passageway.

3. The child safety barrier of claim 1, wherein said first and second correlated magnets are each independently attachable to said structural element on the first side of said passageway and said barrier with an adhesive or are integrated into said structural element and said barrier.

4. The child safety barrier of claim 1, wherein said first and/or said second correlated magnet are attachable to said structural member and/or said barrier by a strap, a latch or a locking mechanism.

5. The child safety barrier of claim 1, wherein said barrier is attachable to said second structural element on the second side of the passageway by one or more hinges.

6. The child safety barrier of claim 1, wherein said first structural element on said first side of said passageway and said second structural element on said second side of the passageway are independently selected from a vertical post, a wall, and a frame.

7. The child safety barrier of claim 1, wherein said barrier is attachable to said second structural element by one or more pairs of correlated magnets.

8. A method of securing a passageway or stairwell from child access comprising the steps of:
    a) securing a gate assembly comprising a pair of complementary correlated magnets within said passageway or an access point to said stairwell and
    b) aligning the pair of complementary correlated magnets to lock said gate assembly in a closed position wherein:
    said pair of complementary correlated magnets comprises a first correlated magnet and a second correlated magnet and said locking said gate assembly comprises;
    a passageway barrier assembly for a passageway, said passageway having first and second opposed sides, wherein said barrier assembly comprises:
    a first correlated magnet attachable to a structural element on the first side of said passageway and
    a barrier comprising a second correlated magnet, said barrier being attachable to a second structural element on the second side of the passageway opposing said first side and positionable into a closed state in which the barrier spans across the passageway and an open state in which the barrier does not span across the passageway; and wherein:
    said first correlated magnet is capable of being aligned with said second correlated magnet such that said first and second correlated magnets produce an attractive force that holds said first and second magnets together and secures said barrier in said closed position;
    said attractive force is a peak spatial force of a spatial force function;
    said spatial force function corresponds to a code modulo defined by a code that defines said peak spatial force and a plurality of off peak spatial forces; and
    said plurality of off peak spatial forces have a largest off peak spatial force that is less than half of the peak spatial force.

9. The method of claim 8, further comprising unlocking said gate by turning a mechanism adapted to be applied to said first or said second correlated magnetic field structure to decorrelate said first or said second correlated magnetic structures enabling said gate to be moveable into an open position.

10. The method of claim 8, wherein said first and second correlated magnets are each independently attachable to said structural element on the first side of said passageway and said barrier with an adhesive or are integrated into said structural element and said barrier.

11. The method of claim 8, wherein said first and/or said second correlated magnet are attachable to said structural member and/or said barrier by a strap, a latch or a locking mechanism.

12. The method of claim 8, wherein said barrier is attachable to said second structural element on the second side of the passageway by one or more hinges.

13. The method of claim 8, wherein said first structural element on said first side of said passageway and said second structural element on said second side of the passageway are independently selected from a vertical post, a wall, and a frame.

14. The method of claim 8, wherein said barrier is attachable to said second structural element by one or more pairs of correlated magnets.

15. A correlated magnet baby gate securing system, comprising;
    a first correlated magnetic field structure securely attached to a baby gate and a second correlated magnetic field structure that is complementary to said first correlated magnetic field structure secured to a support structure to which said baby gate; may be secured wherein:

said first correlated magnetic field structure associated with said baby gate is capable of being aligned with the second correlated magnetic field structure attached to said support structure such that said first and second correlated magnet field structures produce an attractive force that secures said baby gate to said support structure;

said attractive force is a peak spatial force of a spatial force function;

said spatial force function corresponds to a code modulo defined by a code that defines said peak spatial force and a plurality of off peak spatial forces; and said plurality of off peak spatial forces have a largest off peak spatial force that is less than half of the peak spatial force.

16. The system of claim 15, further comprising a turning mechanism adapted to be applied to said first or said second correlated magnetic field structure to decorrelate said first or said second correlated magnetic structures enabling said baby gate to be removed from said support structure.

17. The system of claim 15, wherein said first and second correlated magnetic field structures are attached to said baby gate and said support structure with an adhesive.

18. The system of claim 15, wherein said first and second correlated magnetic field structures are integrated into said baby gate and said support structure.

19. The system of claim 15, wherein said support structure are the vertical support members defining an entrance to a stairwell.

20. The system of claim 15, wherein said support structure are the vertical support members defining a passage way.

* * * * *